United States Patent [19]
Bell et al.

[11] Patent Number: 5,498,925
[45] Date of Patent: Mar. 12, 1996

[54] FLAT PANEL DISPLAY APPARATUS, AND METHOD OF MAKING SAME

[75] Inventors: Randall F. Bell, Phillipsburg; Gregory P. Kochanski, Dunellen; John Thomson, Jr., Spring Lake, all of N.J.

[73] Assignee: AT&T Corp., Murray Hill, N.J.

[21] Appl. No.: 446,095

[22] Filed: May 19, 1995

Related U.S. Application Data

[63] Continuation of Ser. No. 57,946, May 5, 1993, abandoned.

[51] Int. Cl.$^6$ ........................................ H01J 19/24
[52] U.S. Cl. ........................ 313/497; 313/561; 313/308
[58] Field of Search ................................. 313/483, 466, 313/422, 496, 495, 497, 561, 292, 112, 308, 268; 345/37, 38, 41, 47, 50, 60, 75, 87; 348/786, 790, 791, 796; 359/609, 614, 885, 891; 315/169.4

[56] References Cited

U.S. PATENT DOCUMENTS

| | | | |
|---|---|---|---|
| 3,634,714 | 1/1972 | Anderson et al. | 313/494 |
| 3,814,629 | 6/1974 | Hansen et al. | 313/466 X |
| 3,855,499 | 12/1974 | Yamada et al. | 313/494 X |
| 4,140,941 | 2/1979 | Uemura | 313/495 |
| 5,235,244 | 8/1994 | Spindt | 313/308 X |
| 5,283,500 | 8/1994 | Kochanski | 313/309 X |
| 5,347,199 | 9/1994 | Van Gurkom et al. | 313/495 X |

FOREIGN PATENT DOCUMENTS

| | | |
|---|---|---|
| 0278405A2 | 8/1988 | European Pat. Off. . |
| 0367466A2 | 5/1990 | European Pat. Off. . |
| 0485285A1 | 5/1992 | European Pat. Off. . |
| 0044658 | 3/1983 | Japan ........................ 313/422 |
| 0157663 | 7/1987 | Japan ........................ 313/483 |

OTHER PUBLICATIONS

*Semiconductor International*, Dec. 1991, p. 11.
"Filed–Emitter Arrays Applied to Vacuum Fluorescent Display," by C. A. Spindt et al., IEEE Transactions on Electron Devices, vol. 36, No. 1, Jan. 1989, pp. 225–228.
"21.1: Microtips Displays Addressing", by T. Leroux et al., *SID 91 Digest*, p. 437.
"'Microtips' Fluorescent Display", by P. Vaudaine et al., *IEDM 91*, p. 197.
"Recent Development on 'Microtips' Display at Leti," by R. Meyer, Technical Digest of IVMC 91, Nagahama 1991, p. 6.

*Primary Examiner*—Sandra L. O'Shea
*Assistant Examiner*—Ashok Patel
*Attorney, Agent, or Firm*—E. E. Pacher; B. S. Schneider

[57] ABSTRACT

The disclosed multi-pixel flat panel displays (e.g., flat panel field emission displays (FPFED) or liquid crystal displays (LCD)) includes spaced apart first and second electrodes, with a patterned solid material layer in contact with one of the electrodes, exemplarily between the two electrodes. The patterned layer (referred to as the "web") includes a multiplicity of apertures, with at least one (preferably three or more) aperture associated with a given pixel. In the aperture is disposed a quantity of a second material, exemplarily, a phosphor in the case of an FPFED, or a color filter material in the case of a LCD. The web can facilitate second material deposition by means of, e.g., screen printing, typically making possible formation of smaller phosphor or filter dots than was possible by prior art device. The web also can facilitate provision of spacer structure between the two electrodes, and can include getter or hygroscopic material.

7 Claims, 4 Drawing Sheets

FLAT PANEL DISPLAY APPARATUS, AND METHOD OF MAKING SAME

This application is a continuation of application Ser. No. 08/057,946, filed on May 5, 1993, now abandoned.

FIELD OF THE INVENTION

This invention pertains to flat panel display apparatus, exemplarily field emission display apparatus, and to methods of making such apparatus.

BACKGROUND OF THE INVENTION

Flat panel field emission displays (FPFEDs) are known. See, for instance, the report on page 11 of the December 1991 issue of *Semiconductor International*. See also C. A. Spindt et al., *IEEE transactions on Electron Devices*, Vol. 36(1), pp. 225–228, incorporated herein by reference. Briefly, such a display typically comprises a flat vacuum cell with a matrix array of microscopic field emitter cathode tips formed on the back plate of the cell, and a phosphor-coated anode on the front plate of the cell. Between cathode and anode is a third element, frequently referred to as "grid" or "gate".

As depicted schematically in the above referenced *Semiconductor International* item, the anode structure for a color display exemplarily comprises a glass plate with transparent conductive material (e.g., indium-tin-oxide or ITO) thereon, with the conductive material patterned into three sets of stripes, each covered with a cathodoluminescent (e.g., emitting red, green or blue light) material, with the same cathode used for the three colors of the pixel. See, for instance, also T. Leroux et al., *SID 91 Digest*, p. 437; P. Vaudaine et al., *IEDM 91*, p. 197; R. Meyer, *Technical Digest of IVMC 91*, Nagahama 1991, p. 6 all incorporated herein by reference. However, other arrangements are possible, as will be discussed in more detail below.

Anode structures for prior art color FPFEDs typically are made by a relatively costly, difficult to control process that typically involves photolithography and selective deposition of electrically charged phosphor particles.

In view of the potential commercial importance of color FPFEDs, it would be desirable to have available displays having an anode structure that can be readily manufacturable at relatively low cost. This application discloses such displays, and methods of making them.

SUMMARY OF THE INVENTION

In broad aspects, the invention is embodied in an article that comprises novel flat panel display means (e.g., a FPFED or a liquid crystal display), and to a method of making the display means.

More specifically, it is exemplarily embodied in multi-pixel flat panel display means that comprise spaced apart first and second electrode means, with at least one of said electrode means comprising a multiplicity of predetermined regions, with a given one of said regions being associated with a given pixel. The display means further comprise means for selectively applying an electrical signal to said electrode means. Significantly, the display means still further comprise a patterned layer of a first solid material in contact with one of said first and second electrode means, said patterned layer comprising a multiplicity of apertures, with at least one of said apertures being associated with the given pixel, with a second solid material disposed in said at least one aperture.

The patterned first material layer will typically comprise a regular array of apertures, and we will refer to the layer as the "web" or the "web layer". Although not so limited, the web layer is advantageously formed by a process that involves application and firing of a slurry or paste (collectively "slurry"). The second material disposed within the apertures in the web layer is, in an exemplary embodiment, a phosphor material, and in another exemplary embodiment, a color filter material. In the former case the display exemplarily is a FPFED, and in the latter it exemplarily is a liquid crystal display (LCD). In both cases, the second material within the apertures of the web exemplarily and advantageously is applied by a process that comprises screen printing. It is also contemplated to optionally include an active agent (e.g., a getter material in the case of an FPFED or a hygroscopic material in the case of a LCD) in the web.

Provision of the web can have several advantageous results. The presence of the web can isolate individual phosphor or filter sites, typically resulting in simplification of the process of application of the phosphor or filter materials, especially for color displays. If the web material is opaque and has low reflectivity, its presence can result in improved color contrast. The web can also serve as a spacer structure. For instance, presence of a web in a FPFED can facilitate attainment of a precisely dimensioned gap between the emitter points and the phosphor target. These and other advantages can typically be attained at relatively low cost, as those skilled in the art will discern from our description of a preferred method of making apparatus according to the invention.

DETAILED DESCRIPTION OF A PREFERRED EMBODIMENT

For the sake of clarity, the invention will be further described primarily in terms of a particular embodiment, namely, a FPFED. Those skilled in the art will appreciate, however, that the invention is not thus limited. For instance, a web may advantageously be put on a (flat) screen of a CRT, with phosphor placed into the apertures of the web.

The cathode (emitter) structure in a FPFED according to the invention can be conventional, of any appropriate type, including structures disclosed in U.S. patent application Ser.

No. 07/889,735 filed May 28, 1992, now U.S. Pat. No. 5,283,500. Herein the gate electrode is considered to be pan of the cathode structure.

The anode structure exemplarily is made as follows. An appropriate transparent, flat substrate (e.g., PYREX®, quartz or other glass having thermal expansion coefficient substantially matched to that of the sealing glass and emitter structure) is provided. It will be understood that planarity of the inward-facing substrate surface must be within limits required for subsequent process steps, e.g., photolithography. This may, but need not, require precision grinding of the surface, as is known from the prior art. It will typically be necessary to provide two non-parallel reference edges to facilitate subsequent process steps, e.g., registry of screen printing masks, but use of fiduciary marks is also contemplated. Typically the reference edges are formed by precision grinding of two adjacent sides of a, typically quadrilateral, glass plate.

The inward-facing substrate surface typically is then coated with ITO or other suitable transparent conductive material. This step is conventional and does not require elaboration. For reasons that are discussed below, deposition of the conductive layer is optional.

Subsequently, an appropriate photo-definable organic (frequently referred to as a photoresist) film (e.g., RISTON®, obtainable from E. I. Dupont de Nemours and Company) is deposited on the conductor layer (or the substrate). The thickness of the organic film is selected in accordance with the desired thickness of the (to be formed later) web layer, as will become apparent. Considerations will include the known degree of shrinkage of both the organic layer and of the web material. Techniques for forming a resist layer of uniform thickness on a substrate are known in the semiconductor art and can be readily applied to the instant case. After conventional preparatory treatment (e.g., baking at 150° C. for about 10 minutes) the organic film is selectively (exemplarily through a glass mask) exposed to actinic radiation. Exemplarily, the radiation source is a high pressure mercury-xenon arc lamp. After exposure, an appropriate solvent (e.g., 10 mole % sodium hydroxide in water) is used to remove the unwanted areas of the film. All of this can be conventional and does not require elaboration.

Figure 1:
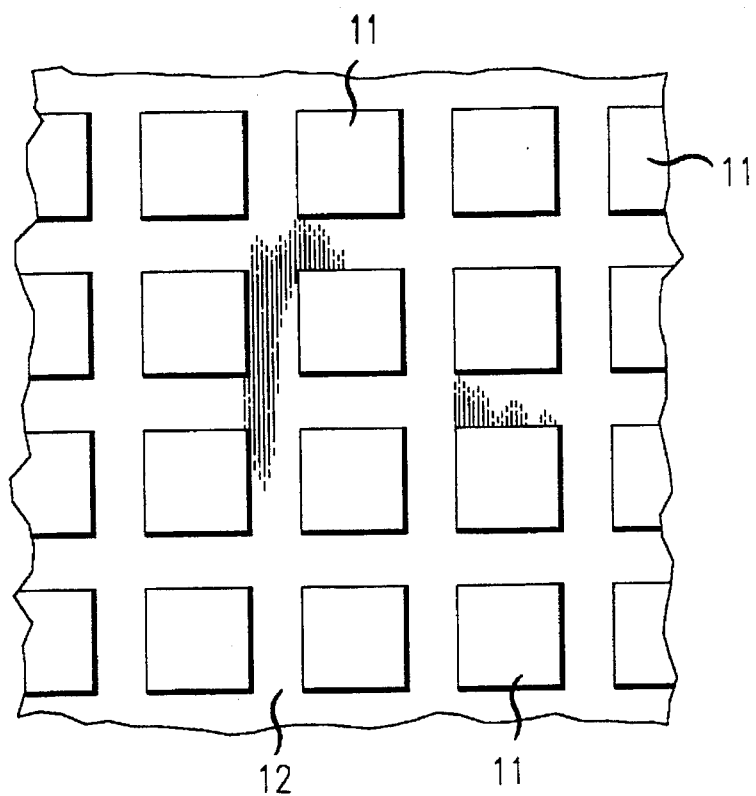
FIG. 1 schematically depicts a portion of a FPFED anode assembly at an intermediate stage of manufacture, namely, after patterning of a photoresist layer.

The photomask is selected such that appropriately shaped and positioned photoresist "islands" remain after solvent treatment. FIG. 1 schematically depicts a portion of an exemplary arrangement in top view. Numerals 11 refer to the photoresist islands, and numeral 12 to the channels between the islands. Exemplarily, the islands are of approximate size 200×160 µm, the channels are approximately 50 µm wide, and the island height is in the approximate range 25–125 µm, with ITO exposed in the channel areas.

Subsequent to the solvent treatment, a slurry is spread over the surface with the resist islands thereon, such that the channels are, typically, uniformly filled to the top. This can readily be done by known techniques. The slurry comprises solid particles (of average size much smaller than the channel width, exemplarily less than 10% of the width) and a (organic or aqueous) liquid carrier vehicle (e.g., water and polyvinyl alcohol). Many such vehicles are known (see, for instance, A. Pincus et al., *Ceramic Industry*, Vol. 92(4), p. 106) and those skilled in the art will readily be able to select one that meets their specific requirements. The solid particles typically (but not necessarily) comprise a light absorbing, low reflectivity (typically ≤20% reflectivity) material (e.g., carbon in a carbon/glass composite). The slurry optionally may also comprise further organic or inorganic material, selected to assist in maintaining the shape of the web during subsequent consolidation. Exemplary of such materials are phosphoric acid, boric acid, and various silicas. Many other potentially useful such materials are known (see, for instance, U.S. Pat. Nos. 4,975,619 and 3,582,389), and those skilled in the art will be readily able to select one that suits their particular requirements.

Figure 2:
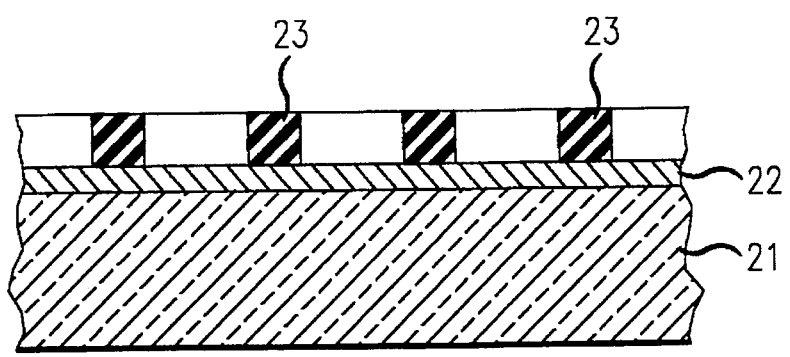
FIG. 2 schematically shows, in cross section, a portion of an anode assembly at an intermediate stage subsequent to the stage of FIG. 1, namely, after consolidation of the web material.

After filling the channels with the slurry, the slurry is typically allowed to substantially dry, followed by consolidation of the remaining slurry material such that the solid web is formed. Exemplarily, this is accomplished by placing the substrate in a furnace and heating the furnace to an appropriate temperature or temperatures. Typically, the remaining resist material volatilizes at relatively low temperatures (e.g., 200°–300°), leaving the unconsolidated solid pattern. If, for instance, a carbon/glass composite (with the glass having a melting temperature of 450° C.) is used, the temperature is raised from the volatilization temperature to about 450° C. for a time (e.g., about 10 minutes) sufficient to allow the glass component to fuse to the carbon particles and to the substrate, resulting in a rigid web structure. FIG. 2 schematically shows a cross section through a portion of an exemplary structure, wherein numeral 21 refers to the substrate, 22 to the conductor layer, and 23 to the sectioned arms of the web.

Those skilled in the art will recognize that the above technique of forming the web is exemplary only, and that other techniques (e.g., a printing process such as screen or offset printing) may be used, consistent with resolution requirements. For instance, a printing process will frequently provide adequate resolution for large flat panel screens (e.g., flat panel TV screens), or for large, flat, CRT screens.

Subsequent to consolidation of the web, second solid material (in the instant exemplary case cathodoluminescent material) is placed within the apertures in the web. Although the invention can be embodied in a monochrome display, a preferred embodiment is a color display comprising three sets of phosphor sites, one for each primary color (e.g., red, green and blue). Phosphors suitable for use in color FPFEDs are known. Exemplarily, the phosphors are zinc sulfide-based.

The currently preferred technique of placing phosphor material within the web apertures involves screen printing, an economical, well known technique. However, electrostatic deposition through masks is also contemplated. Typically, a separate screen is used for each color phosphor, with the previously prepared reference edges of the substrate (or fiduciary marks) facilitating accurate screen placement.

Figure 3:
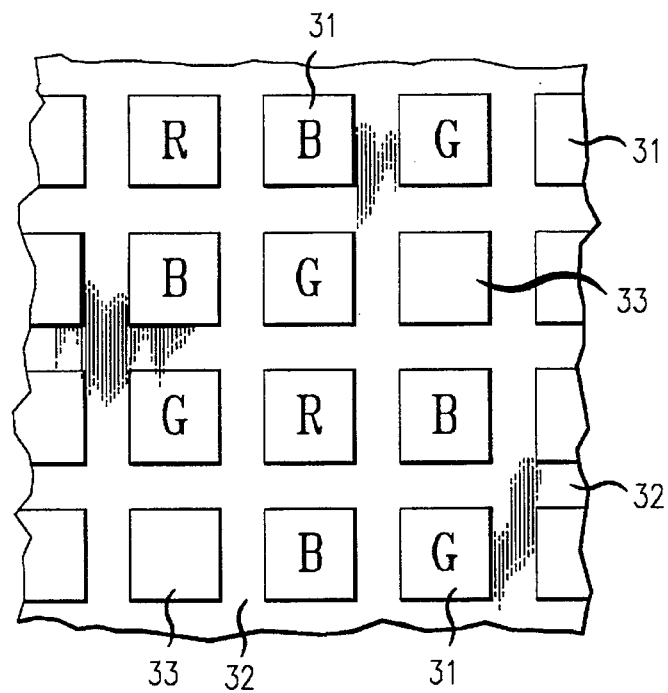
FIGS. 3 and 4 show a portion of respective exemplary anode structures according to the invention.

FIG. 3 schematically depicts a portion of an exemplary anode structure (corresponding to FIG. 1 ) in top view. Numerals 31 refer to phosphor regions, with letters R, G and B referring, respectively, to red, green and blue phosphor. Numerals 32 refer to the web material, and numerals 33 refer to (optional) empty apertures which can be provided to, e.g., receive appropriate spacer means (e.g., glass microspheres or solid "posts").

Figure 4:
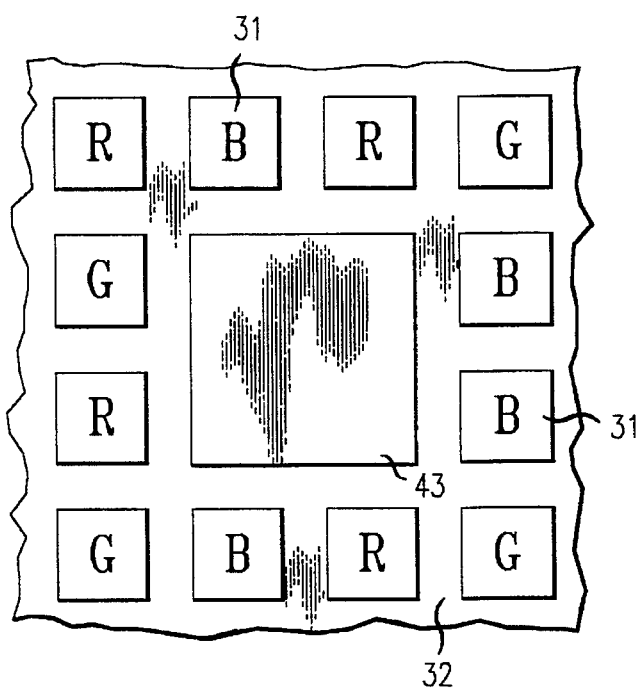

FIG. 4 shows another exemplary structure, comprising post 43 on an aperture-free web region. It will be appreciated that provision of post 43 is optional, and that a web of uniform thickness (possibly after appropriate machining to improve smoothness and/or thickness tolerance) can serve as spacer means. If the spacer means comprise a post then an appropriate amount of material (exemplarily a slurry or paste) will typically be deposited into, e.g., blank apertures 33, or onto the aperture-free web region 43, followed by an appropriate heat treatment to consolidate the post material.

It will furthermore be appreciated that the arrangements of phosphors of FIGS. 3 and 4 are exemplary only, and that other arrangements can be readily devised. Although in currently preferred embodiments the anode conductive layer is substantially unpatterned, with all three sets of phosphors at the same (constant) voltage during display operation, and multiplexing only at the cathode, this is not a requirement, and the instant invention can be embodied in displays that utilize anode multiplexing, e.g., of the type disclosed in the cited references.

As those skilled in the art will appreciate, the amount of material deposited in a given web aperture by screen printing is generally controlled by the screen design and the degree of solids loading in the phosphor paste, and thus cannot be specified in generality. However, a minor amount of experimentation will typically suffice to determine an appropriate paste formulation. We have observed that frequently a gasketing effect between the upper web surface and an organic emulsion on the bottom of the screen assists in confining paste deposition to specific locations, avoiding intermixing of phosphors. We currently believe that this effect is at least in part responsible for the observed ability to print into the web phosphor dots which are much smaller than can typically be printed onto an initially flat substrate. After each application of phosphor material, it is desirable to substantially dry the deposited material.

As is known, phosphor powder films frequently have to be mechanically stabilized to avoid flaking off. This is conventionally achieved by deposition of a thin continuous Al film over the phosphor, and use of this approach in displays according to the invention is contemplated. However, we currently prefer incorporation of appropriate "glue" material into the phosphor paste. See, for instance, the above cited '619 and '389 patents. Exemplarily, the paste comprises a minor amount (typically ≤5% by weight) of phosphoric or boric acid, which can be readily convened to oxides during subsequent heat treatment (typically at temperatures below 500° C.), with the oxides serving to bond the phosphor to the conductive layer and thus to the substrate. Alternatively, tetraethyl orthosilicate (TEOS) may be useful as a glue material, and also may serve to enhance light emission.

Following completion of the phosphor deposition process, it will frequently be advantageous to deposit a thin (e.g., 10–20 nm) metal (typically Al) film over substantially all of the inward-facing surface, to serve as a reflector of emitted light. In the alternative, the web can be formed directly on the glass substrate without intervening conductor (e.g., ITO) layer, the web and phosphor surface can be planarized, and a continuous metal (typically Al) film (of thickness consistent with the requirement of electron transmission through the film) deposited on the planarized surface. This metal film serves as anode, and furthermore facilitates both charge dissipation and light reflection.

A thus produced anode structure and an appropriate emitter structure are then assembled into a unitary structures. The emitter structure can be conventional. Desirably the emitter structure is as disclosed in U.S. patent application No. 07/889,735, filed May 28, 1992 by G. P. Kochanski, now U.S. Pat. No. 5,283,500. Any appropriate assembly technique is contemplated. Typically the mating structures are joined together by means of a low melting point glass (e.g., Corning Glass Works 7585 sealing glass).

Figure 5:
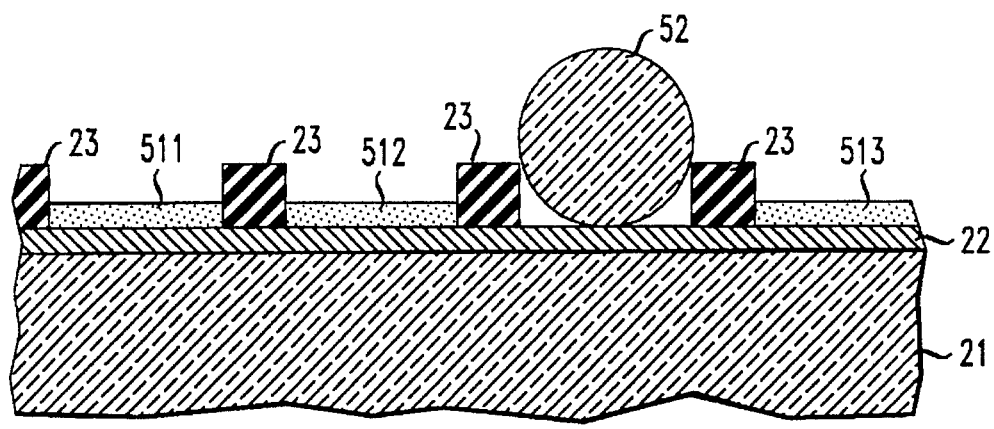
FIG. 5 schematically, in cross section, depicts a portion of an exemplary anode structure prior to assembly of anode and emitter structure.

Exemplarily, assembly is carried out as follows. Glass spheres (diameter 100 µm) are spread over the inward-facing surface of the anode structure. The sphere diameter is selected such that only one sphere can occupy a given vacant web site 33, facilitating removal of excess spheres. FIG. 5 schematically, in cross section, shows a portion of an exemplary anode structure, with a spacer sphere 52 in "blank" aperture 33. Numerals 511,512 and 513 refer to phosphor dots, e.g., red, green and blue phosphor, respectively. The emitter structure desirably is provided with corresponding depressions, imparting self-alignment ability to the assembly. After placing an appropriate low melting point glass tape (exemplarily 150–200 µm thickness, about 6 mm width,) around the perimeter of the anode structure, the emitter structure is then appropriately positioned, resting on the glass tape. Previously precision machined edges of both structures permit initial alignment.

Subsequently, the assembly is heated in a vacuum furnace to a temperature sufficient to result in melting of the sealing glass ribbon (and less than the melting temperature of the web material). Softening of the sealing glass results in gradual lowering of the emitter structure towards the anode structure, until the spacer spheres support the weight of the former and, desirably, final alignment takes place through homing of the spacer spheres into the appropriately positioned depressions in the inward-facing emitter structure surface.

The sealing glass ribbon desirably contains organic binder material which volatilizes at temperatures below the glass melting temperature, resulting in a residue of substantially porous glass. Thus, the assembly desirably is maintained in the temperature range between the binder volatilization temperature and the glass melting temperature for a time sufficient to permit attainment of the desired low pressure in the interior space of the assembly. Typically this pressure is less than about $10^{-5}$ Torr.

The sealing glass typically will also be selected such that its decompose and/or melting temperature is above the temperature required to decompose and/or react any glue material still present in the phosphor. Slow cooling to room temperature completes the exemplary assembly process.

A second exemplary assembly process is substantially as above, except that the web performs the spacer function. In many cases it will be desirable to initially form a web that is somewhat thicker (e.g., 50–100 µm thicker) than the desired final web thickness, and to planarize, smooth and properly dimension the web layer after slurry consolidation. A third exemplary assembly process uses, previously formed and ground to the desired height, spacer posts.

Various variations of the above described methods are possible and are contemplated. For instance, getter material (e.g., a known Zr-Fe-Al alloy powder, particle size less than about 10 µm, obtainable from Saes Getters, Inc., of Colorado Springs, Colo.) can be incorporated into the slurry, resulting in the presence of the getter material in the web. After appropriate activation, the getter powder can serve to maintain a low pressure inside the assembled flat panel display.

Figure 6:
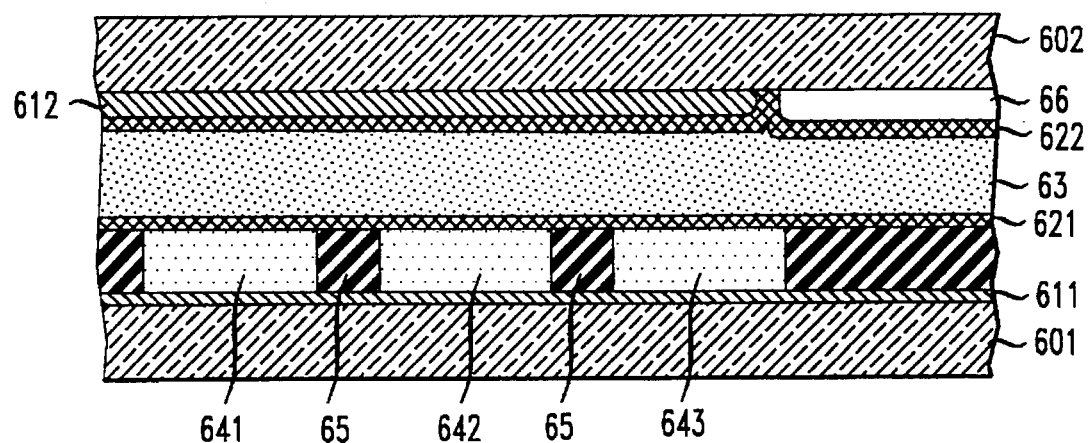
FIG. 6 schematically depicts a portion of another article according to the invention, namely, a liquid crystal display.

The invention can also be embodied in a liquid crystal display (LCD), as schematically shown in FIG. 6, wherein numerals 601 and 602 refer to glass plates, numerals 611 and 612 to conductor layers (e.g., ITO), 621 and 622 to orientation layers (e.g., polyimide or PMMA), and 63 to conventional liquid crystal material. Numeral 66 schematically indicates known means (comprising exemplarily a thin film transistor and conductors) that serve to switch a given pixel between a light transmissive state and a non-transmissive state in response to an appropriate external signal. In addition to the above recited conventional means, a LCD according to the invention comprises a web substantially as described. Numeral 65 refers to the arms of the web, seen in cross section, and numerals 641–643 refer to known color filters, typically red, green and blue filters. Hygroscopic material (e.g., zeolite particles) can be incorporated into the web to prevent build-up of dissolved water in the cell.

A LCD according to the invention can be made substantially as described, except that color filter material and not phosphor material is applied by silk screening. Again, the presence of the web permits formation of smaller filter dots than was possible according to the prior art, and can lead to displays with increased resolution and color purity.

Figure 7:
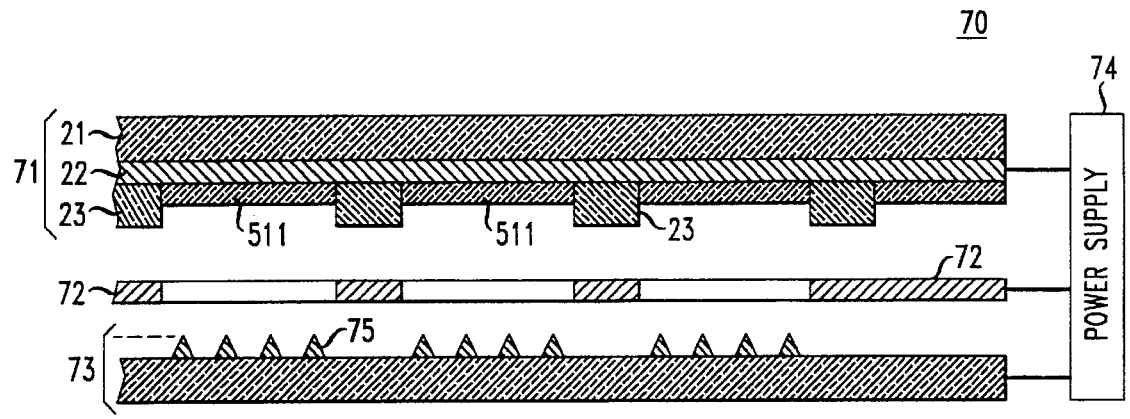
FIG. 7 schematically shows a portion of exemplary FPFED apparatus according to the invention.

FIG. 7 shows schematically a portion of a multipixel FPFED apparatus 70 according to the invention, wherein numeral 71 refers to an anode substantially as shown in FIG. 5, 72 refers to gate means with apertures, and 73 refers to cathode means, the gate and cathode means exemplarily as described in U.S. Pat. No. 5,283,500, with the cathode comprising microemitters 75. Numeral 74 refers to conventional means for selectively applying an electrical signal to cathode, gate and anode. Spacer means between the electrodes can be conventional and are not shown. Furthermore, it will be understood that the electrodes (72, 73) are joined together, although such joining is not shown in FIG. 7.

Figure 8:
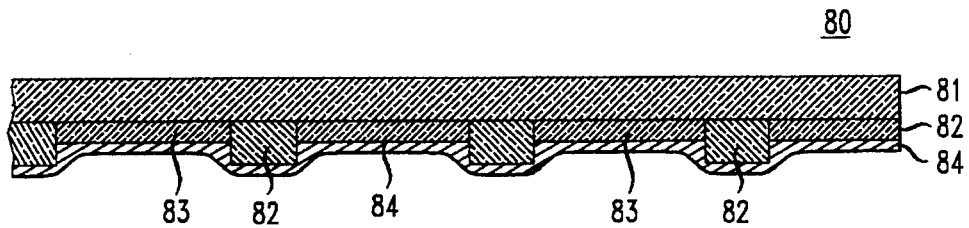
FIGS. 8 and 9 schematically depict exemplary anode structures according to the invention.

FIG. 8 schematically depicts a portion of a further anode structure (80) according to the invention, wherein numerals 81–84 refer, respectively, to a transparent substrate, the patterned layer of first solid material (the "web"), the phosphor, and the first electrode means. It will be understood that the structure 80 can exemplarily be substituted for structure 71 in FIG. 7.

Figure 9:
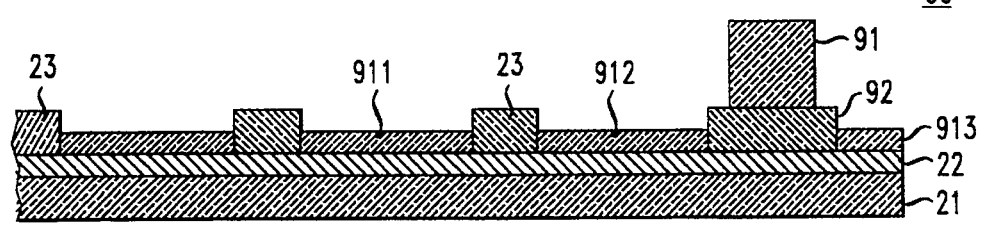

FIG. 9 schematically shows a portion of a further exemplary anode structure (90) that is substantially as shown in FIG. 5, except that solid body 91 of predetermined height is disposed on an aperture-free portion 92 of the first material layer. The solid body serves as spacer means in substantially the same manner as sphere 52 of FIG. 5.

We claim:

1. Multi-pixel flat panel field emission cathodoluminescent display means comprising a) spaced apart first and second electrode means;
b) means for selectively applying an electrical signal to said electrode means;
c) gate means between said first and second electrode means; wherein the display means further comprise
d) a patterned layer of a first solid material in contact with one of said first and second electrode means, said patterned layer comprising a multiplicity of apertures, said first solid material being consolidated slurry material comprising conductive particles; and
e) a quantity of a second solid material disposed in at least one of said apertures, said second solid material being cathodoluminescence material.

2. Article according to claim 1, wherein the conductive particles comprise carbon particles.

3. Display means according to claim 2, wherein said first electrode means are disposed on a transparent substrate, with said patterned layer of first solid material disposed on said first electrode means.

4. Display means according to claim 1, wherein said patterned layer of first solid material is disposed on a transparent substrate, with said first electrode means disposed on said patterned layer and said material capable of cathodoluminescence is disposed in said aperture.

5. Display means according to claim 1, wherein said multiplicity of apertures comprises at least a first, second and third aperture, said first, second and third apertures being associated with a given pixel, with material capable of cathodoluminescence disposed in said first, second and third apertures, with said material capable of cathodoluminescence disposed in said first, second and third apertures selected to emit radiation of a first, second and third color, respectively.

6. Display means according to claim 5, wherein said first solid material is substantially opaque to, and less than 20% reflectivity for, radiation of said first, second and third colors.

7. Display means according to claim 1, wherein said first solid material comprises getter material.

\* \* \* \* \*